(12) United States Patent
Kato et al.

(10) Patent No.: US 6,631,495 B2
(45) Date of Patent: *Oct. 7, 2003

(54) ELECTRONIC DOCUMENT IDENTIFICATION, FILING, AND RETRIEVAL SYSTEM

(75) Inventors: Yasuo Kato, Kanagawa (JP); Masahito Sakakibara, Kanagawa (JP); Etsushi Sato, Kanagawa (JP); Satoshi Koyama, Kanagawa (JP); Ryuichi Horigane, Kanagawa (JP); Hiroshi Iida, Kanagawa (JP); Jun Miyazaki, Kanagawa (JP)

(73) Assignee: Fuji Xerox Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,574

(22) Filed: Jun. 11, 1998

(65) Prior Publication Data

US 2001/0011283 A1 Aug. 2, 2001

(30) Foreign Application Priority Data

Jun. 12, 1997 (JP) .............................................. 9-155433

(51) Int. Cl.[7] .......................... G06F 15/00; G06F 17/00; G06F 17/21; H04N 1/00

(52) U.S. Cl. ...................... 715/500; 358/403; 235/375; 380/9

(58) Field of Search ............................. 707/500, 1, 10, 707/501.1; 308/403; 358/403; 382/306; 713/177; 235/375; 380/9

(56) References Cited

U.S. PATENT DOCUMENTS 5,486,686 A * 1/1996 Zdybel, Jr. et al. ......... 235/375
5,680,223 A * 10/1997 Cooper et al. ............... 358/403

(List continued on next page.)

FOREIGN PATENT DOCUMENTS

JP 60-12573 1/1985
JP 63-95578 4/1988

(List continued on next page.)

OTHER PUBLICATIONS

Identifying an Externally Assigned Document Name, IBM Technical Disclosure Bulletin, vol. 32, Issue 9B, p. 103, Feb. 1990.*

(List continued on next page.)

*Primary Examiner*—Joseph H. Feild
*Assistant Examiner*—William L. Bashore
(74) *Attorney, Agent, or Firm*—Finnegan, Henderson, Farabow, Garrett & Dunner LLP (57) ABSTRACT

An electronic document filing method and a system using the same is disclosed. The system comprises identification code addition means for adding identification code proper to the electronic document thereto, electronic document transfer means for registering the electronic document to which the identification code is added to the document server, print means for printing the registered electronic document and the identification code on the same paper face, identification code read means for reading the identification code printed on the paper face, identification code interpretation means for interpreting the identification code read by the identification code read means, and identification code transfer means for transferring the identification code interpreted by the identification code interpretation means to the document server.

13 Claims, 11 Drawing Sheets

U.S. PATENT DOCUMENTS

| | | | | |
|---|---|---|---|---|
| 5,745,664 A | * | 4/1998 | Nomura et al. | 395/117 |
| 5,754,308 A | * | 5/1998 | Lopresti et al. | 358/403 |
| 5,765,176 A | * | 6/1998 | Bloomberg | 707/514 |
| 5,781,629 A | * | 7/1998 | Haber et al. | 713/177 |
| 5,848,415 A | * | 12/1998 | Guck | 707/10 |
| 5,860,075 A | * | 1/1999 | Hashizume et al. | 707/530 |
| 5,893,129 A | * | 4/1999 | Pollard | 707/522 |
| 5,950,213 A | * | 9/1999 | Iida et al. | 707/505 |
| 5,978,477 A | * | 11/1999 | Hull et al. | 380/9 |
| 6,029,160 A | * | 2/2000 | Cabrera et al. | 707/1 |
| 6,035,308 A | * | 3/2000 | Yano et al. | 707/501.1 |
| 6,052,494 A | * | 4/2000 | Ohtani | 382/306 |

FOREIGN PATENT DOCUMENTS

| | | |
|---|---|---|
| JP | 63-242060 | 10/1988 |
| JP | Hei. 2-2461 | 1/1990 |
| JP | Hei. 2-73466 | 3/1990 |
| JP | Hei. 3-291756 | 12/1991 |
| JP | Hei. 4-232564 | 8/1992 |
| JP | Hei. 4-295886 | 10/1992 |
| JP | Hei. 4-363268 | 12/1992 |
| JP | Hei. 5-108794 | 4/1993 |
| JP | Hei. 6-40092 | 2/1994 |
| JP | Hei. 6-44320 | 2/1994 |
| JP | Hei. 6-46244 | 2/1994 |
| JP | Hei. 6-83879 | 3/1994 |
| JP | Hei. 7-21214 | 1/1995 |
| JP | Hei. 7-115537 | 5/1995 |
| JP | Hei. 7-146854 | 6/1995 |
| JP | Hei. 7-200634 | 8/1995 |
| JP | Hei. 7-200748 | 8/1995 |
| JP | Hei. 7-271826 | 10/1995 |
| JP | Hei. 7-273926 | 10/1995 |
| JP | Hei. 7-295958 | 11/1995 |
| JP | Hei. 8-16605 | 1/1996 |
| JP | Hei. 8-50598 | 2/1996 |
| JP | Hei. 8-83283 | 3/1996 |
| JP | Hei. 8-102824 | 4/1996 |
| JP | Hei. 8-251223 | 9/1996 |

OTHER PUBLICATIONS

Geshwind, PCT International Published Application, pub. No. WO 96/41463, Dec. 1996.*

* cited by examiner

FIG. 12

ELECTRONIC DOCUMENT IDENTIFICATION, FILING, AND RETRIEVAL SYSTEM

BACKGROUND OF THE INVENTION

1. Technical Field of the Invention

The present invention relates to a method and a system using the same for filing an electronic document and in particular to an electronic document filing method and system using the same which enable the user to easily register and retrieve an electronic document.

2. Background of the Related Art

In recent years, with development in information processing systems, document processing systems and so on, electronic documents have been used increasingly and documents have been used in various manners.

Figure 12:
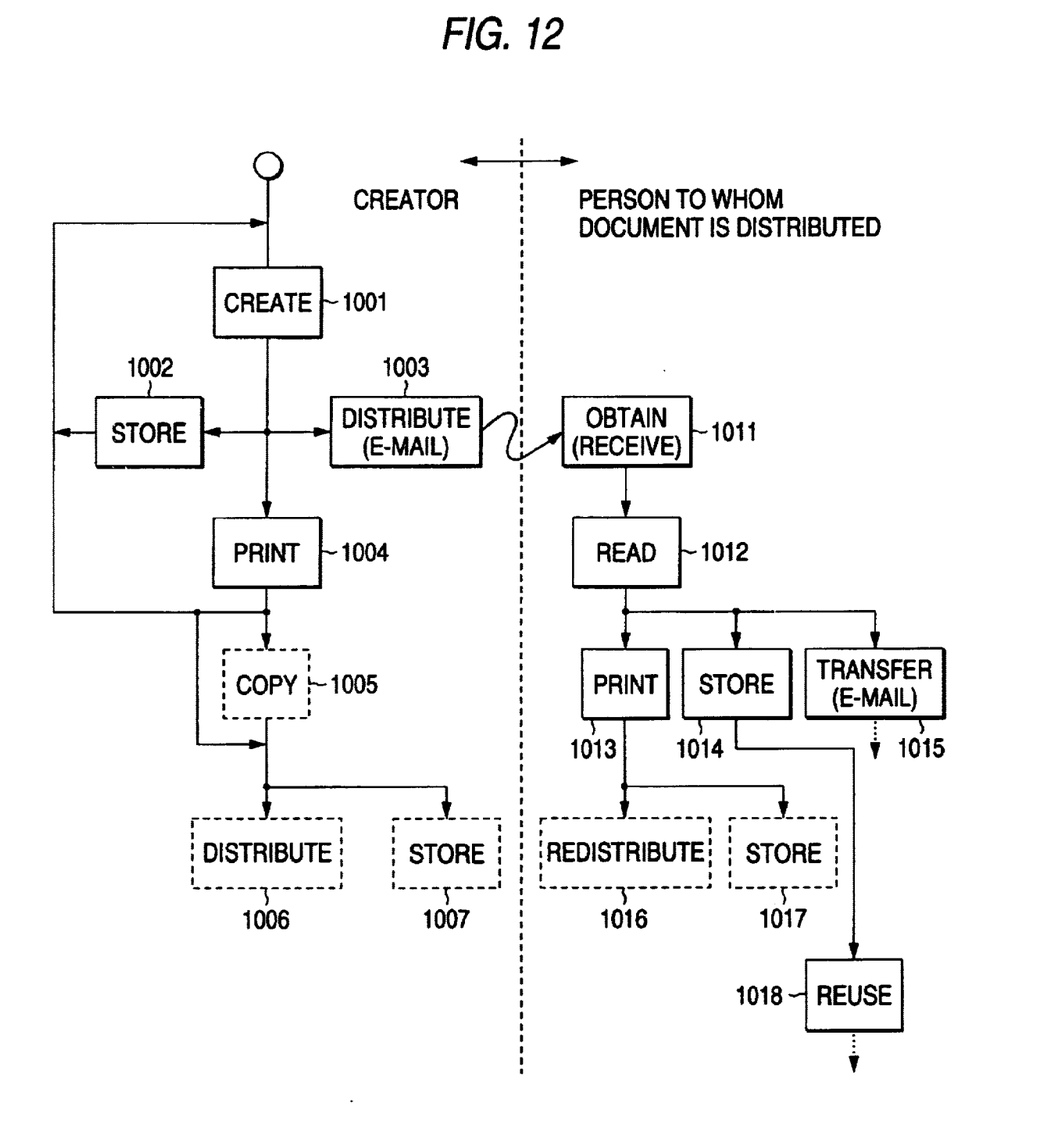
FIG. 12 is a chart to show a document life cycle.

Here, FIG. 12 shows a document life cycle.

In FIG. 12, each step represented by a solid line denotes an electronic document and each step represented by a dashed line denotes a paper-printed document.

A document created by a creator at step 1001 is stored on a storage such as hard disk or in a document registration server at step 1002, is distributed by electronic E-mail at step 1003, or is printed on paper at step 1004.

The document stored at step 1002 may be reused by the creator and the document printed on paper at step 1004 is copied as required at step 1005 and is distributed as a paper document at step 1006 or is stored at step 1007.

On the other hand, the person who gets at step 1011 the electronic document distributed by E-mail at step 1003 reads the received document at step 1012 and prints the document at step 1013, stores the document at step 1014, or transfers the document to another person by E-mail at step 1015 as required.

The document printed on paper at step 1013 is distributed at step 1016 or stored at step 1017 as a paper document and the document stored at step 1014 is reused as required at step 1018.

The person who gets the transferred document at step 1015 handles the document like the person who receives the electronic document at step 1011.

Thus, electronic documents can be easily reused as well as created, printed, distributed, and stored; they can be used effectively as compared with paper documents.

However, to reuse an electronic document, the user must obtain the electronic document in a paper print format or an electronic file format from the location (hardware) where the electronic document is stored.

In general, the user can get an electronic document by entering the storage location and the document name, but if such information does not exist, the document must be found with a keyword, etc.

At this time, if the user has a printed document on hand, the required document can be obtained in the paper print format by copying the printed document, but it is not useful to obtain the electronic document in the electronic file format.

Thus, the electronic documents can be easily reused, but it is hard to obtain a specific electronic document. Then, systems for easily obtaining electronic documents are proposed.

There are proposed electronic document registration and retrieval systems using facsimiles and so on, for example, in Unexamined Japanese Patent Publication Nos. Hei 2-73466, Sho 63-242060, Sho 63-95578, Hei 2-2461, Hei 7-273926, Hei 8-251223, Hei 8-102824.

However, the registration and retrieval systems require a specifically designed form using a mark sheet, etc., to register or retrieve a document and the user must enter specification contents for the registration and the retrieval on the form.

There are proposed electronic document registration and retrieval systems wherein when a registered electronic document is printed on paper, identification code such as bar code, is also printed with the document, and is read for retrieving the registered electronic document, for example, in Unexamined Japanese Patent Publication Nos. Hei 3-291756, Hei 5-108794, Hei 6-44320, Hei 7-200634, Hei 8-16605. Moreover, there are proposed electronic document registration and retrieval systems wherein when a registered electronic document is printed on paper, additional information code, is also printed with the document, and is read for retrieving the registered electronic document, for example, in Unexamined Japanese Patent Publication Nos. Hei 8-50598, Hei 4-363268, Hei 6-40092, Hei 7-146854, Hei 7-271826.

However, in the electronic document registration and retrieval systems, for example, the identification code such as bar code, must be printed at a predetermined position on paper and the document print area is narrowed, or the bar code may interfere with the layout, depending on the document.

There are proposed systems for recording a structured document, a program, data, etc., on a document in a machine-readable format, for example, in Unexamined Japanese Patent Publication Nos. Hei 4-232564, Hei 6-83879, Hei 6-46244, Hei 7-200748, Hei 7-21214, however in the systems, a suggestion about retrieving and reusing a document is not made either.

In addition, such arts for using bar code, etc., to relate printed documents and electronic documents to each other are also proposed, for example, in Unexamined Japanese Patent Publication Nos. Hei 4-295886, Sho 60-12573, Hei 7-295958, Hei 7-115537, Hei 8-83283. In these systems, the bar code is printed on a book, an encyclopedia, etc., and is read, thereby outputting a related picture or voice, however, a suggestion concerning generation of identification code such as bar code is not made either.

As described above, the electronic document is a document form that can be reused easily, but to reuse the electronic document, the user must retrieve it from the unit where the electronic document is stored, and retrieval work and registration work to facilitate retrieval are intricate.

An art is also proposed wherein if the user has a paper-printed document on hand, identification code, etc., is printed with the document at the printing time, and is used to retrieve the corresponding electronic document. However, a procedure of giving registration information on which the identification code is based is complicated or the identification code narrows the document print area or interferes with the layout.

SUMMARY OF THE INVENTION

It is therefore an object of the present invention to provide an electronic document filing method and system using the same which can add identification code to a document without narrowing the document print area or interfering with the document layout, and which can easily retrieve the corresponding electronic document based on the identification code.

According to the present invention, there is provided an electronic document filing method comprises the steps of the steps of adding identification code proper to an electronic document thereto, registering the electronic document to which the identification code is added in a document server connected through a network, printing the registered electronic document and the identification code on the same paper face, reading the printed identification code, and retrieving and obtaining the electronic document based on the read identification code.

According to the method of the present invention, the document server may determine a location where the electronic document is to be stored based on the identification code added to the electronic document at the time of document registration, and may select and transfer the stored electronic document based on the corresponding identification code at the time of document retrieval.

According to the method of the present invention, the electronic document may be registered automatically at the same time as it is printed, is transmitted to another user, is received from another printer, or is input through an image reader.

According to the method of the present invention, the identification code may be printed on an arbitrary layout at an arbitrary position on the paper face.

According to the method of the present invention, the identification code may be printed on the paper face as bar code.

According to the method of the present invention, after a printing area of the electronic document is set, the identification code may be printed where except on the printing area of the electronic document at the time of printing.

According to the present invention, there is provided an electronic document filing system comprises identification code addition means for adding identification code proper to the electronic document thereto, electronic document transfer means for registering the electronic document to which the identification code is added to the document server, print means for printing the registered electronic document and the identification code on the same paper face, identification code read means for reading the identification code printed on the paper face, identification code interpretation means for interpreting the identification code read by the identification code read means, and identification code transfer means for transferring the identification code interpreted by the identification code interpretation means to the document server.

According to the system of the present invention, the document server may include document storage means for determining a location where the electronic document is to be stored based on the identification code added to the electronic document, and storing the electronic document in the determined location, document selection means for receiving the identification code transferred by the identification code transfer means and selecting the electronic document stored by the document storage means, and document sending means for sending the electronic document selected by the document selection means.

According to the system of the present invention, the electronic document may be registered automatically at the same time as it is printed, is transmitted to another user, is received from another printer, or is input through an image reader.

According to the system of the present invention, the identification code addition means may include an identification code generating section generating the identification code, print data generating section converting the electronic document into an print image data, and a data combining section combining the identification code with the print image data.

According to the system of the present invention, the print means may print the identification code on an arbitrary layout at an arbitrary position on the paper face.

According to the system of the present invention, the identification code may be printed on the paper face as bar code.

According to the system of the present invention, after a printing area of the electronic document is set as the print image data in the print data generating section, the data combining section may combine the identification code generated from the identification code generating section with the print image data so that the identification code may be printed where except on the printing area of the electronic document.

DETAILED DESCRIPTION OF THE PREFERRED EMBODIMENT

Descriptions will be given below in detail of a preferred embodiment of an electronic document filing method and a system using the same according to the present invention with refer to the accompanying drawings.

Figure 1:
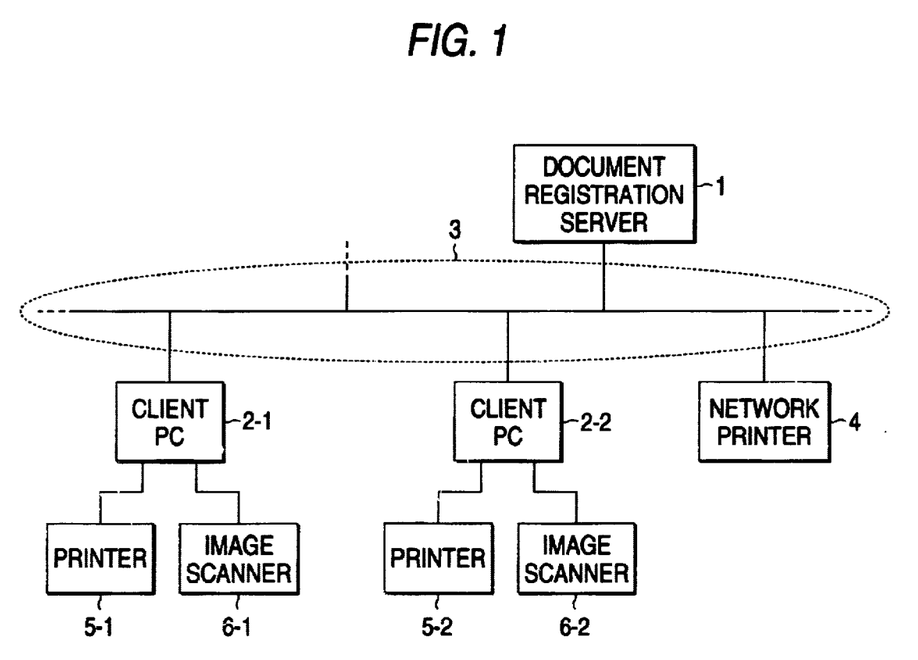
FIG. 1 is a block diagram to show one embodiment of an electronic document filing method and a system using the same according to the present invention.

FIG. 1 is a block diagram to show one embodiment of an electronic document filing method and a system using the same according to the present invention.

In FIG. 1, a document registration server 1 and client PC(personal computer)s 2 (2-1 and 2-2) are connected by a network 3 and a network printer 4 is also connected to the network 3.

A printer 5 (5-1, 5-2) and an image scanner 6 (6-1, 6-2) are connected to each of the client PCs 2 (2-1, 2-2).

When a document is printed, transmitted, or received, or is entered through the image scanner 6 in the client PC 2, it is automatically registered in the document registration server 1. To retrieve the document, the identification code assigned to the document at the time of document registration is read through the scanner.

Figure 2:
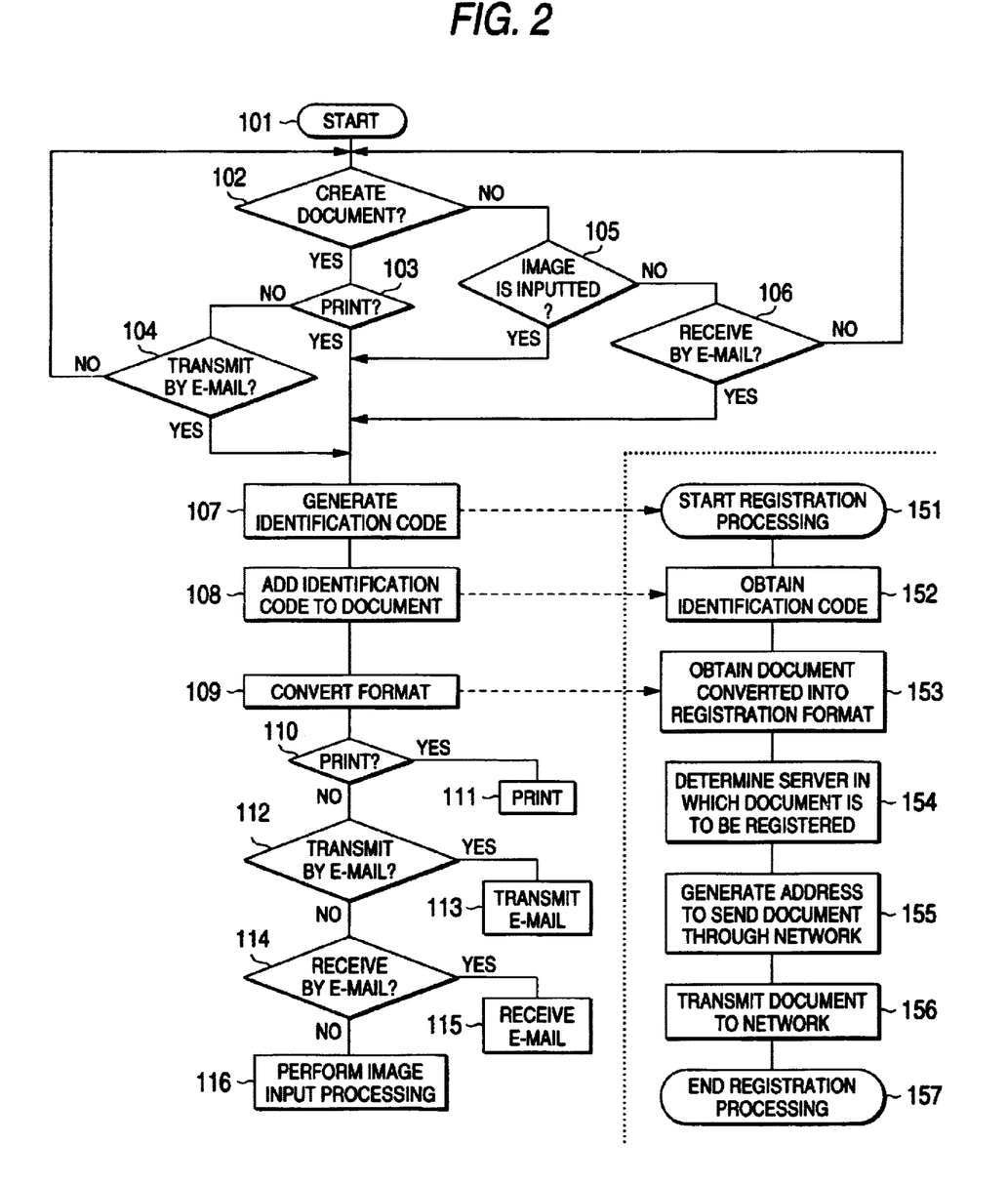
FIG. 2 is a flow chart to show an outline of a document registration flow in a client PC(personal computer)

FIG. 2 is a flow chart to show an outline of a document registration flow in the client PC 2.

In FIG. 2, when the client PC 2 operates at step 101 and a created document is printed (YES at step 102 and YES at step 103) or is transmitted by E-mail (YES at step 102, NO at step 103, and YES at step 104), or paper document is input through the image scanner 6 (NO at step 102 and YES at step 105) or document is received by E-mail (NO at step 102, NO at step 105, and YES at step 106), identification code required for registering the document is generated at step 107.

The identification code is generated as identification code proper to the registered document in the whole network by using the identification code generation time, the document name, the creator name, the network address of the client PC 2, etc.

When the identification code is generated at step 107, the client PC 2 starts a document registration program and starts a registration process at step 151.

The identification code generated at step 107 is added to the document as identification code that can be read through the image scanner, such as bar code, at step 108, and is passed to the registration program at step 152.

The document to which the identification code is added is converted into a predetermined format at step 109. If a command for printing the document is issued before step 107 (YES at step 110), the document is printed at the network printer 4 or the printer 5. If a command for transmitting the document by E-mail is issued (NO at step 110 and YES at step 112), the document is transmitted by E-mail through the network 3 at step 113. If the document is a document received by E-mail through the network 3 (NO at step 112 and YES at step 114), it is received by E-mail at step 115. If the document is a paper document input through the image scanner 6 (NO at step 114), input processing is performed at step 116.

The document converted into the predetermined format at step 109 is processed such as printing (at step 110 or later) and is also converted into a registration format by the registration program at step 153.

Next, the registration program determines the server in which the document is to be registered at step 154 if more than one document registration server exists, and generates an address to send the document through the network 3 at step 155.

When the address is generated, the registration program adds the identification code obtained at step 152 to the document converted into the registration format at step 153 and sends the document to the network 3 at step 156 based on the address generated at step 155, then terminates the document registration process at step 157.

Figure 3:
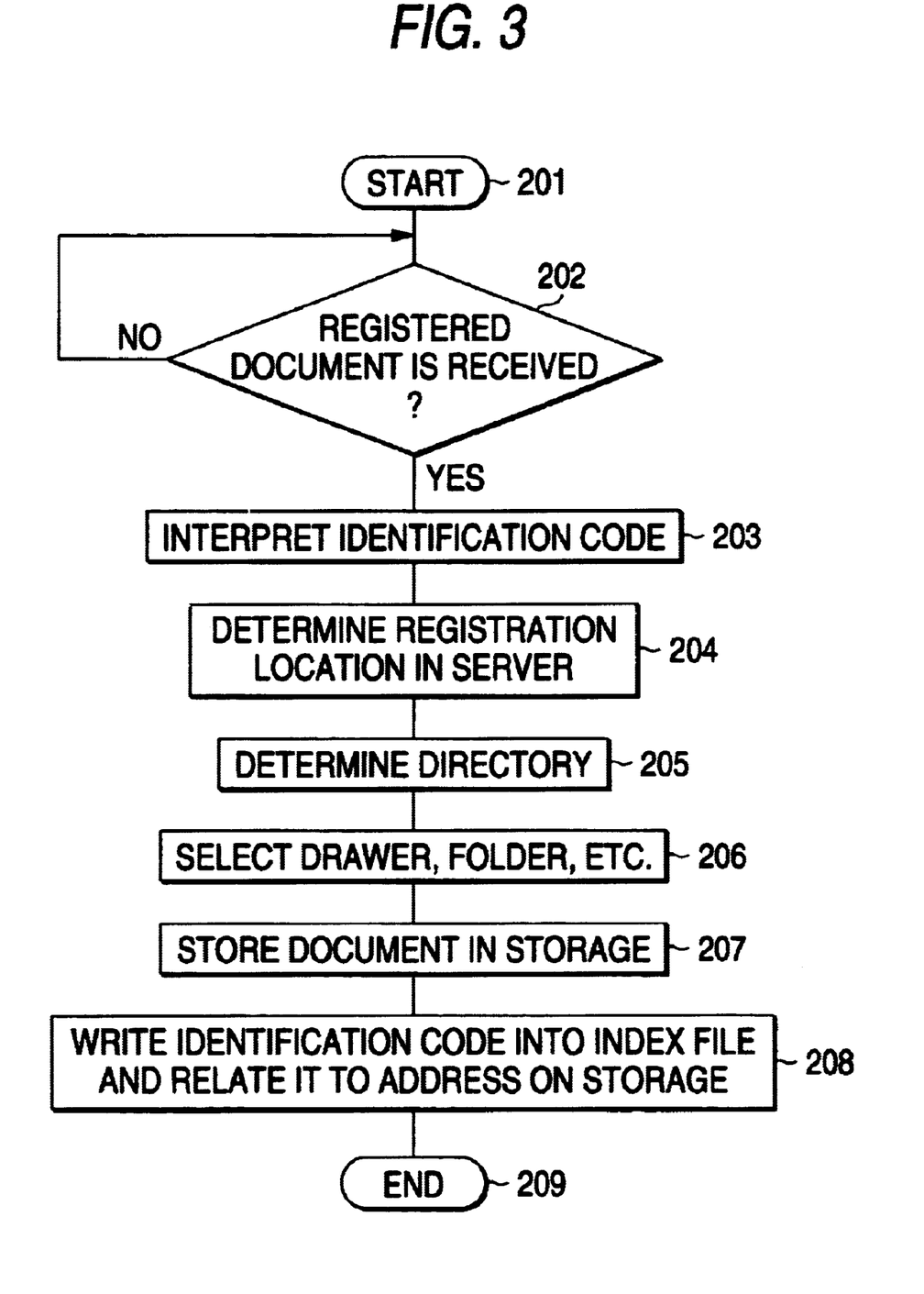
FIG. 3 is a flow chart to show an outline of a document registration flow in a document registration server.
Figure 4:
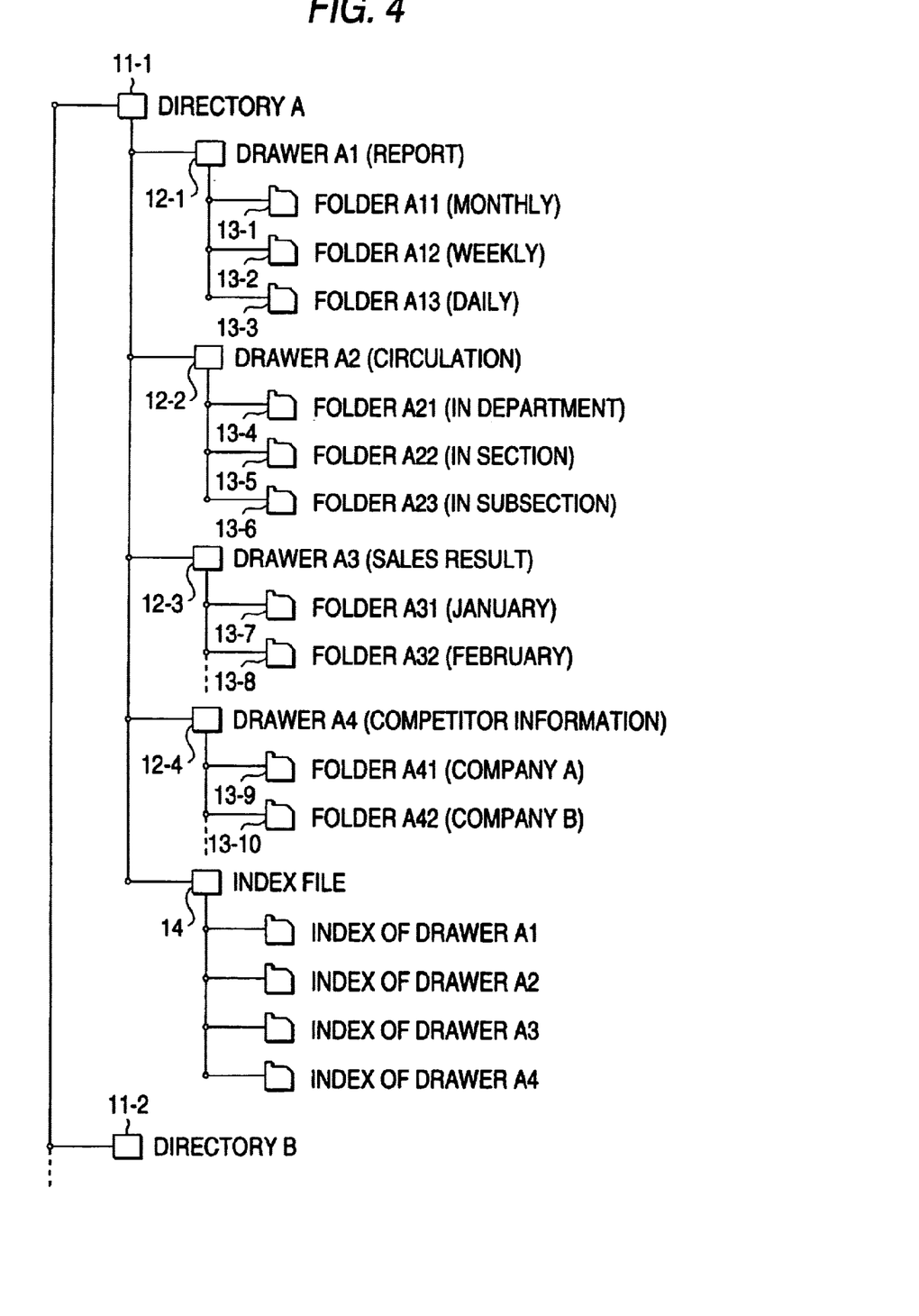
FIG. 4 is an illustration to show a data structure in storage of the document registration server.

FIG. 3 is a flow chart to show an outline of a document registration flow in the document registration server 1. FIG. 4 is an illustration to show a data structure in storage of the document registration server 1.

When the document registration server 1 starts a document registration process at step 201 and receives a registered document transferred through the network 3 from the client PC 2 at step 202, it interprets the identification code added to the registered document at step 203.

Next, the document registration server 1 determines the document registration location therein based on the interpreted identification code at step 204, determines a directory 11 (11-1, 11-2) in which the document is to be registered at step 205, and selects a drawer 12 (12-1 to 12-4) and a folder 13 (13-1 to 13-10) in the directory 11 at step 206.

Upon selection of the drawer 12, folder 13 in which the document is to be registered, the document registration server 1 stores the registered document in the folder 13 at step 207, writes the identification code to the registered document into an index file 14 and relates the identification code to the address of the registered document on the storage at step 208, and terminates the document registration process at step 209.

In the description, the data structure in the storage of the document registration server 1 is a hierarchical structure consisting of the directories 11, the drawers 12, the folders 13, etc., but may be a flat structure, which does not interfere with registration or retrieval either.

Next, the document registration process operation at the time of document printing, the time of E-mail transmission, the time of E-mail reception, and the time of image input in the client PC 2 will be discussed.

Figure 5:
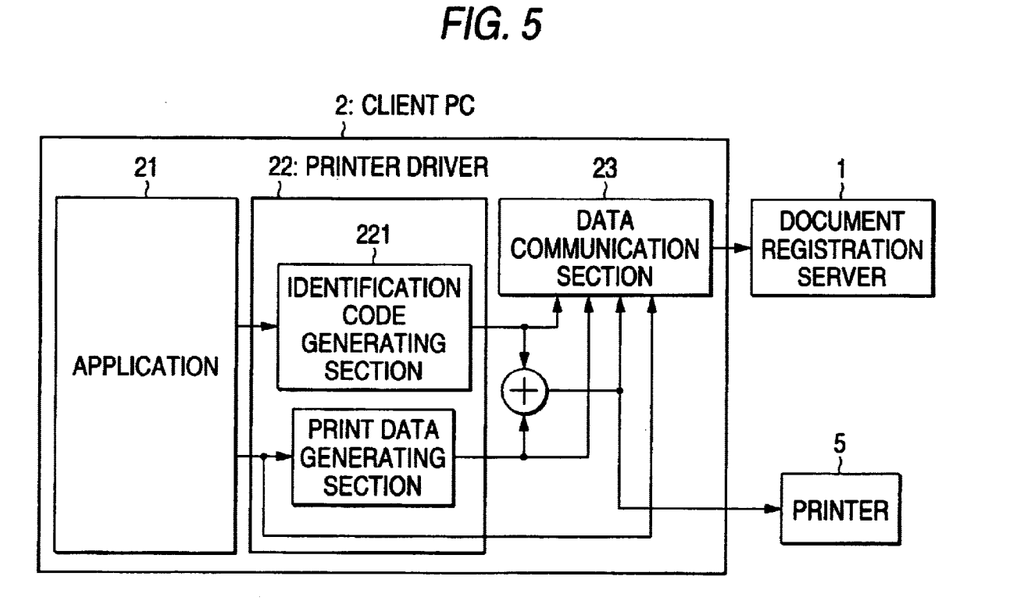
FIG. 5 is a block diagram to show the configuration of the part required for document registration in the client PC when the document is printed.

FIG. 5 is a block diagram to show the configuration of the part required for document registration at the time of document printing in the client PC 2.

In FIG. 5, the client PC 2 comprises an application 21, a printer driver 22, and a data communication section 23.

The printer driver 22 is made up of an identification code generating section 221, a print data generating section 222, and a data combining section 223.

When the user enters a command for printing a document created with the application 21 such as word-processing software, drawing software, or spreadsheet software, the document data required for printing the document and information including the created time, the file name, the creator name and so on, required for generating identification code are transferred from the application 21 to the printer driver 22 (the printer driver 22 may extract the information from the document created with the application 21).

The print data generating section 222 converts the document data into image data and inputs the image data to the data combining section 223 and also directly to the data communication section 23.

The identification code generating section 221 generates identification code proper to the printed document based on the information, input from the application 21 and outputs the identification code to the data communication section 23 and the data combining section 223.

The data combining section 223 converts the identification code input from the identification code generating section 221 into a format that can be read through the image scanner, such as bar code, and combines the conversion result with the image data input from the print data generating section 222, then outputs the result to the printer 5.

At this time, the data combining section 223 combines the identification in a blank portion in the document or the position set by the user so as not to impair the document layout.

Processing such as print data scaling or n-up (multiple-face layout) is performed in the print data generating section 222 and therefore is not performed for the identification code combined by the data combining section 223.

On the other hand, the data communication section 23 adds the identification code generated by the identification code generating section 221 to at least either of the image data input from the data combining section 223 and the data in the format corresponding to the application 21 input therefrom and transmits the data to the document registration server 1.

Figure 6:
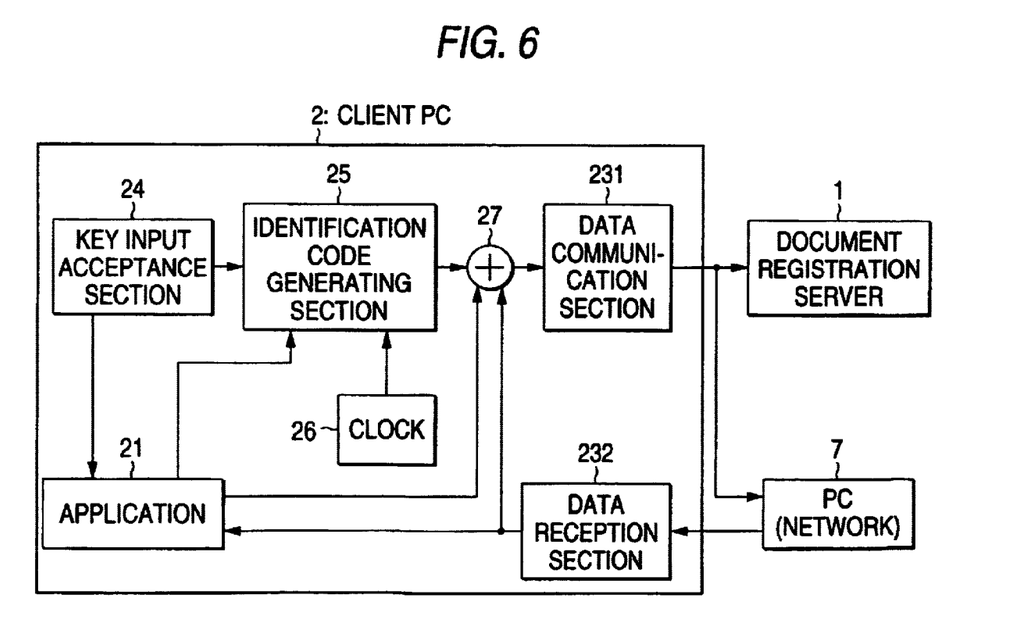
FIG. 6 is a block diagram to show the configuration of the part required for document registration in the client PC when E-mail is transmitted or received.

FIG. 6 is a block diagram to show the configuration of the part required for document registration in the client PC 2 at the time of E-mail transmission or reception.

In FIG. 6, the client PC 2 comprises application 21, a key input acceptance section 24, identification code generating section 25, a clock 26, a data combining section 27, a data transmission section 231, and a data reception section 232.

At the time of E-mail transmission, the application 21 sends document data to the data combining section 27 and also sends information, etc., required for generating identification code, such as the file name and the creator name, to the identification code generating section 25.

The identification code generating section 25 generates identification code proper to the document transmitted by E-mail based on the information of the file name, the creator name, etc., input from the application 21, the time input from the clock 26, and any other information input from the key input acceptance section 24 as required and outputs the identification code to the data combining section 27.

The data combining section 27 combines the document data input from the application 21 and the identification code generated by the identification code generating section 25 and outputs the result to the data transmission section 231.

The data transmission section 231 sends the document to which the E-mail address of an addressee is added through the network 3 to another PC 7 and also sends the document to the document registration server 1.

At the time of E-mail reception, the data reception section 232 receives the document transmitted from the PC 7 through the network 3 and inputs the received document to the application 21 and the data combining section 27.

The application 21 expands the data so that the user can read the document sent by E-mail, and outputs information of the file name, the sender name, etc., required for generating identification code to the identification code generating section 25.

The identification code generating section 25 generates identification code proper to the document received by E-mail based on the information of the file name, the sender name, etc., input from the application 21, the time input from the clock 26, and any other information input from the key input acceptance section 24 as required and outputs the identification code to the data combining section 27.

The data combining section 27 combines the document data input from the data reception section 232 and the identification code generated by the identification code generating section 25 and outputs the result to the data transmission section 231, which then sends the document to the document registration server 1.

Figure 7:
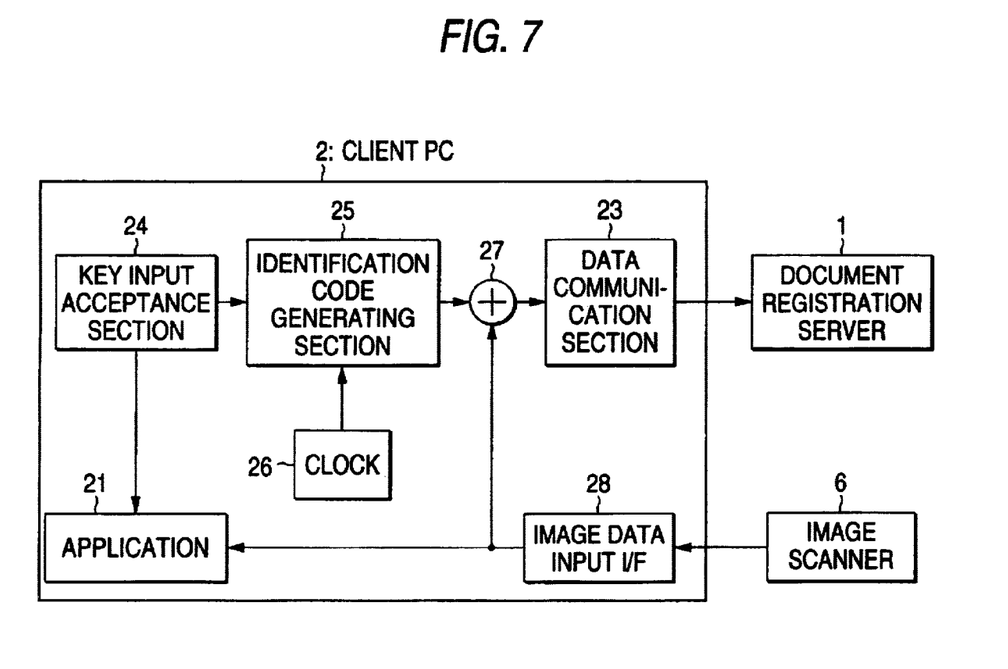
FIG. 7 is a block diagram to show the configuration of the part required for document registration in the client PC when an image is input.

FIG. 7 is a block diagram to show the configuration of the part required for document registration in the client PC 2 at the time of image input.

In FIG. 7, the client PC 2 comprises the application 21, the data communication section 23, the key input acceptance section 24, the identification code generating section 25, the clock 26, the data combining section 27, and an image data input interface (I/F) 28.

At the time of image input, the image data read through the image scanner 6 is input through the image data input I/F 28 to the application 21 and the data combining section 27.

The application 21 processes the image data input by the user such as editing or storing.

On the other hand, the identification code generating section 25 generates identification code proper to the document input as image data based on the information of the file name, the creator name, etc., input from the key input acceptance section 24 and the time input from the clock 26 and outputs the identification code to the data combining section 27.

The data combining section 27 combines the image data input from the image data input I/F 28 and the identification code generated by the identification code generating section 25 and outputs the result to the data communication section 23, which then sends the result to the document registration server 1.

In FIG. 7, the image data input from the image data input I/F 28 is combined with the identification code in the PC 2 and the result is registered in the document registration server 1, but the image data and the identification code may also be combined in an image scanner.

Figure 8:
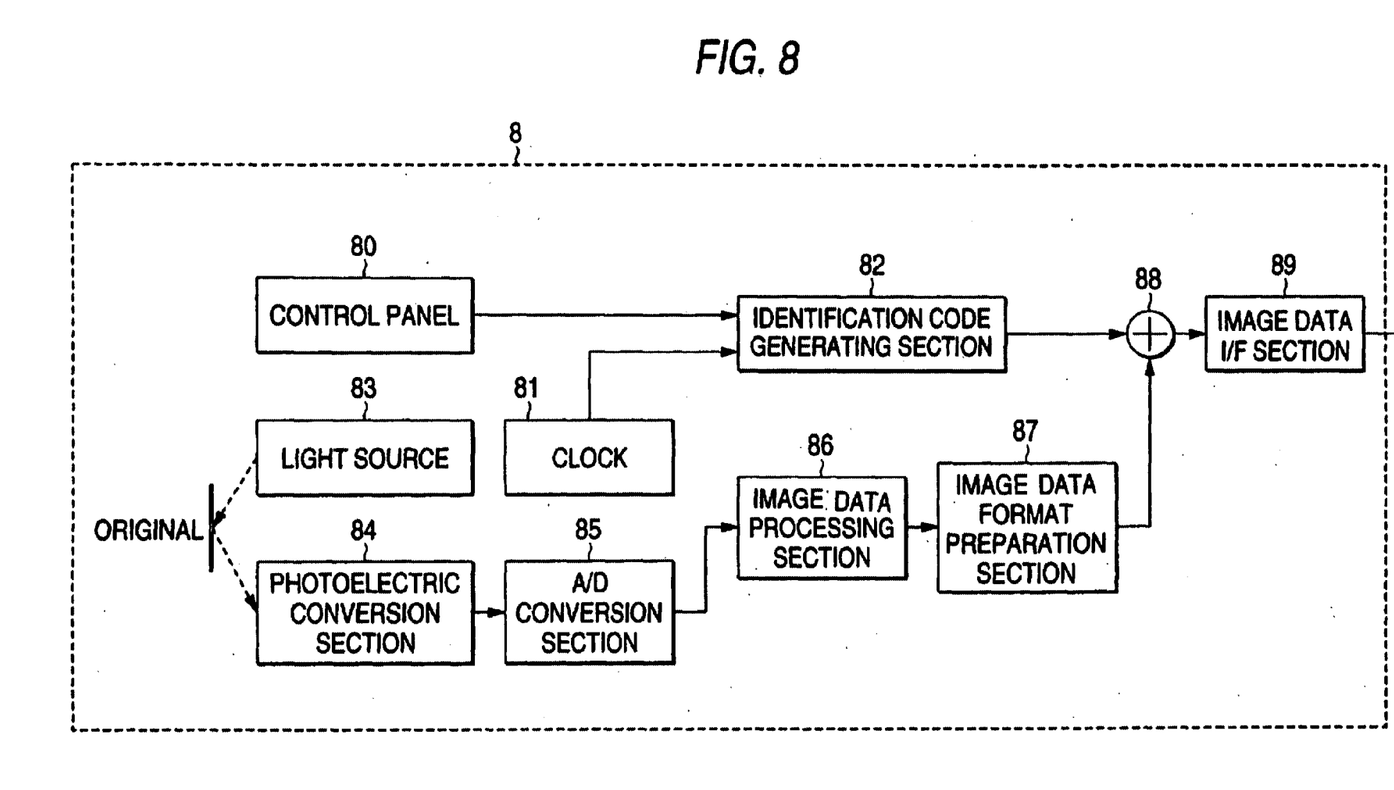
FIG. 8 is a block diagram to show the configuration of an image scanner capable of combining image data and identification code.

FIG. 8 is a block diagram to show the configuration of an image scanner capable of combining image data and identification code.

In FIG. 8, an image scanner 8 comprises a control panel 80, a clock 81, an identification code generating section 82, a light source 83, a photoelectric conversion section 84, an A/D conversion section 85, an image data processing section 86, an image data format preparation section 87, a data combining section 88, and an image data input interface (I/F) section 89.

To input an image through the image scanner 8, the user enters information of file name, input person name, etc., from the control panel 80. The identification code generating section 82 generates identification code proper to the document input as image data based on the information and the time input from the clock 81 and outputs the identification code to the data combining section 88.

On the other hand, the photoelectric conversion section 84 converts light generated from the light source 83 and reflected from the original into an electric signal to generate image data and inputs the image data to the A/D conversion section 85, which then converts the image data from an analog signal into a digital signal and outputs the digital signal to the image data processing section 86.

The image data processing section 86 makes corrections such as a γ correction, a brightness correction, a contrast correction, and a shading correction to the image data input from the A/D conversion section 85 and outputs the resultant data to the image data format preparation section 87.

The image data format preparation section 87 converts the input image data into a predetermined format and outputs the resultant image data to the data combining section 88.

The data combining section 88 combines the image data and the identification code generated by the identification code generating section 82 and the image data input interface (I/F) section 89 outputs the result to the client PC 2

The client PC 2 inputs the document (image data) input through the image scanner 8 to the application 21 and also registers the input document in the document registration server 1.

By the way, the described document registration processing is performed automatically when the user prints a document, transmits or receives a document by E-mail, or inputs an image, the user need not perform special operation for document registration.

Next, retrieving a document registered in the document registration server 1 will be discussed.

Figure 9:
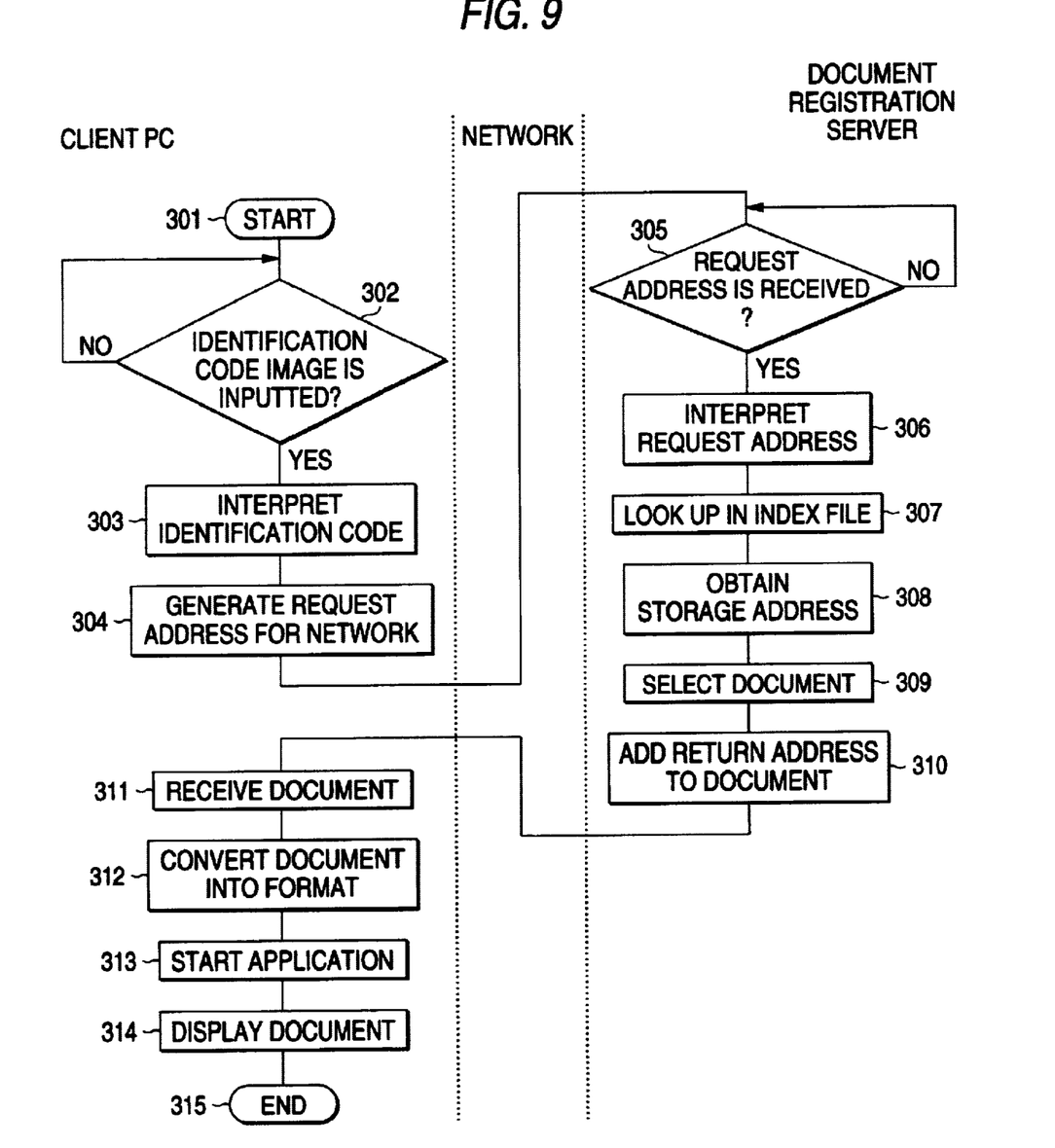
FIG. 9 is a flow chart to show a document retrieval process flow in the client PC and the document registration server.

FIG. 9 is a flow chart to show a document retrieval process flow in the client PC 2 and the document registration server 1.

In FIG. 9, steps 301 to 304 and 311 to 315 are performed in the client PC 2 and steps 305 to 310 are performed in the document registration server 1.

When a document retrieval process is started in the client PC 2 at step 301 and an image of identification code such as bar code is input (YES at step 302), the input identification code is interpreted at step 303 and the document registration server 1 in which the required document is registered is identified from the identification code (if more than one document registration server exists), then a document request address for the network is generated at step 304. The document request address contains the identification code proper to the document, added thereto at the time of document registration as well as the address of the document registration server 1.

The document request address is sent through the network 3 to the document registration server 1. When receiving the document request address (YES at step 305), the document registration server 1 interprets the document request address at step 306.

Next, the document registration server 1 looks up in the index file 14 based on the interpreted document request address at step 307 and obtains a storage address of the requested document at step 308.

The document registration server 1 selects the document based on the storage address at step 309, adds the address of the client PC 2 to the selected document as the return address at step 310, and returns the document to the client PC 2 through the network 3.

The client PC 2, which receives the document at step 311, converts the document into the format corresponding to the used application at step 312, starts the application at step 313, displays the document at step 314, and terminates the document retrieval process at step 315.

By the way, identification code such as bar code is printed at any position on a paper document, thus when the identification code is input as an image, a pen scanner is used or the whole paper face is input as an image through the image scanner before the position of the identification code is found.

Figure 10:
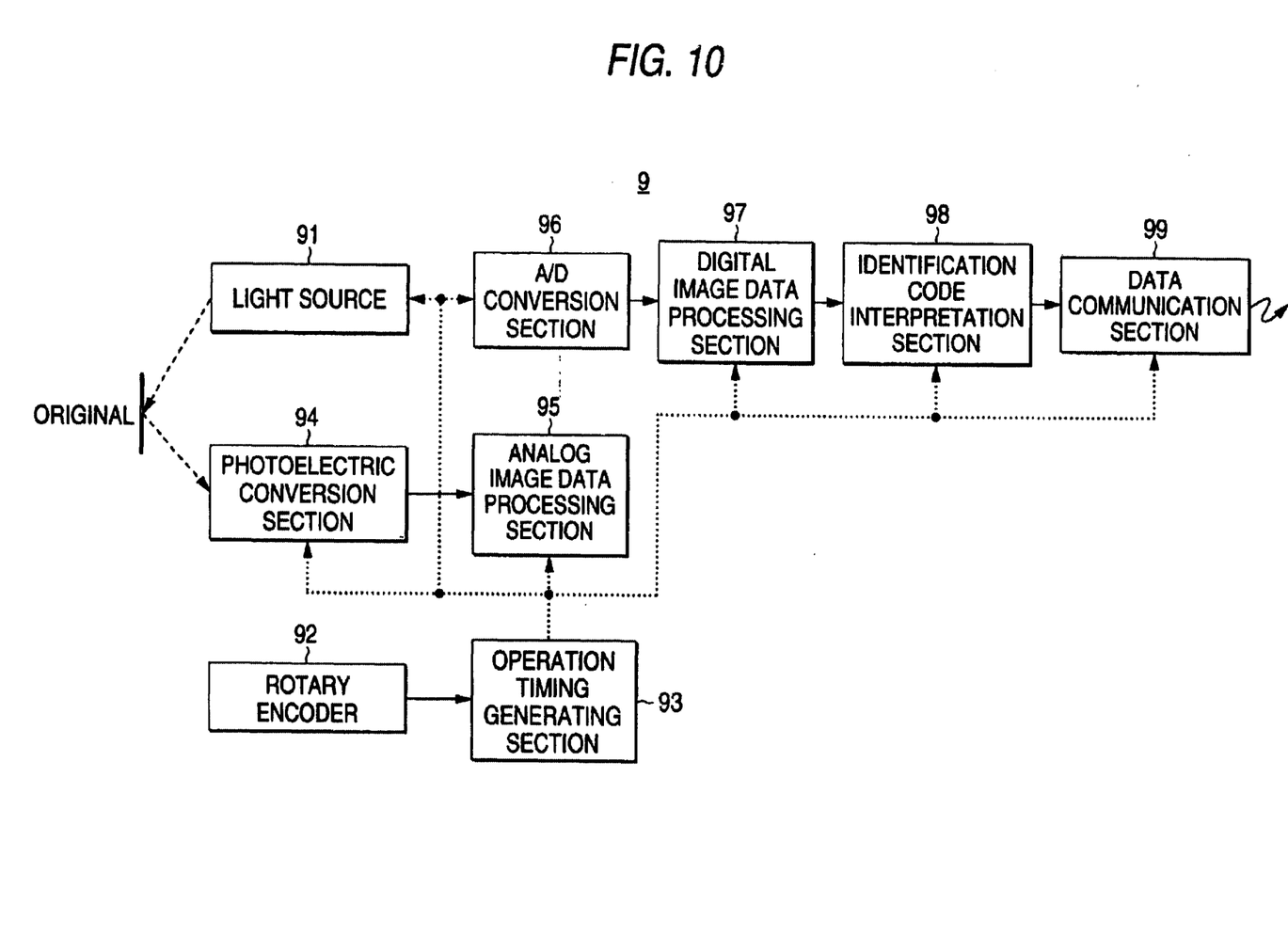
FIG. 10 is a block diagram to show the configuration of a pen scanner for reading identification code such as bar code when the document is retrieved.

FIG. 10 is a block diagram to show the configuration of a pen scanner for reading identification code such as bar code at the document retrieval time.

In FIG. 10, a pen scanner 9 comprises a light source 91, a rotary encoder 92, an operation timing generation section 93, a photoelectric conversion section 94, an analog image data processing section 95, an A/D conversion section 96, a digital image data processing section 97, an identification code interpretation section 98, and a data communication section 99.

When the user scans right over identification code such as bar code with the pen scanner 9, the rotary encoder 92 detects the scan speed (or distance) and outputs the detection result to the operation timing generation section 93.

The operation timing generation section 93 generates operation timing pulses to operate the sections based on output of the rotary encoder 92 and supplies the timing pulses to the sections as indicated by dotted lines in FIG. 10.

On the other hand, the photoelectric conversion section 94 converts a light which is generated from the light source 91 and is then reflected from the identification code printed on the original (as indicated by the dash line in the figure) into an electric signal as image data.

The analog image data processing section 95 makes corrections such as a $\gamma$ correction, a brightness correction, a contrast correction, and a shading correction to the electric signal and the A/D conversion section 96 converts the resultant signal from an analog signal into a digital signal.

The digital image data processing section 97 again makes corrections such as a $\gamma$ correction, a brightness correction, a contrast correction, a shading correction, and a resolution correction to the image data converted into the digital signal as required and inputs the resultant data to the identification code interpretation section 98.

The identification code interpretation section 98 obtains an address of the document registration server 1 in which the retrieved document is registered and the identification code proper to the retrieved document from the image data of the read identification code (corresponding to step 303 in FIG. 9).

The address and the identification code are input to the data communication section 99, which then transfers them to the client PC by using a radio wave or infrared rays.

The pen scanner shown in FIG. 10 is an example, the address and the identification code may be transferred by wire communication and the scanner for reading the identification code need not be a pen scanner, needless to say.

By the way, the user who obtains the retrieved document can reuse the document in such a manner to distribute or edit the document.

Figure 11:
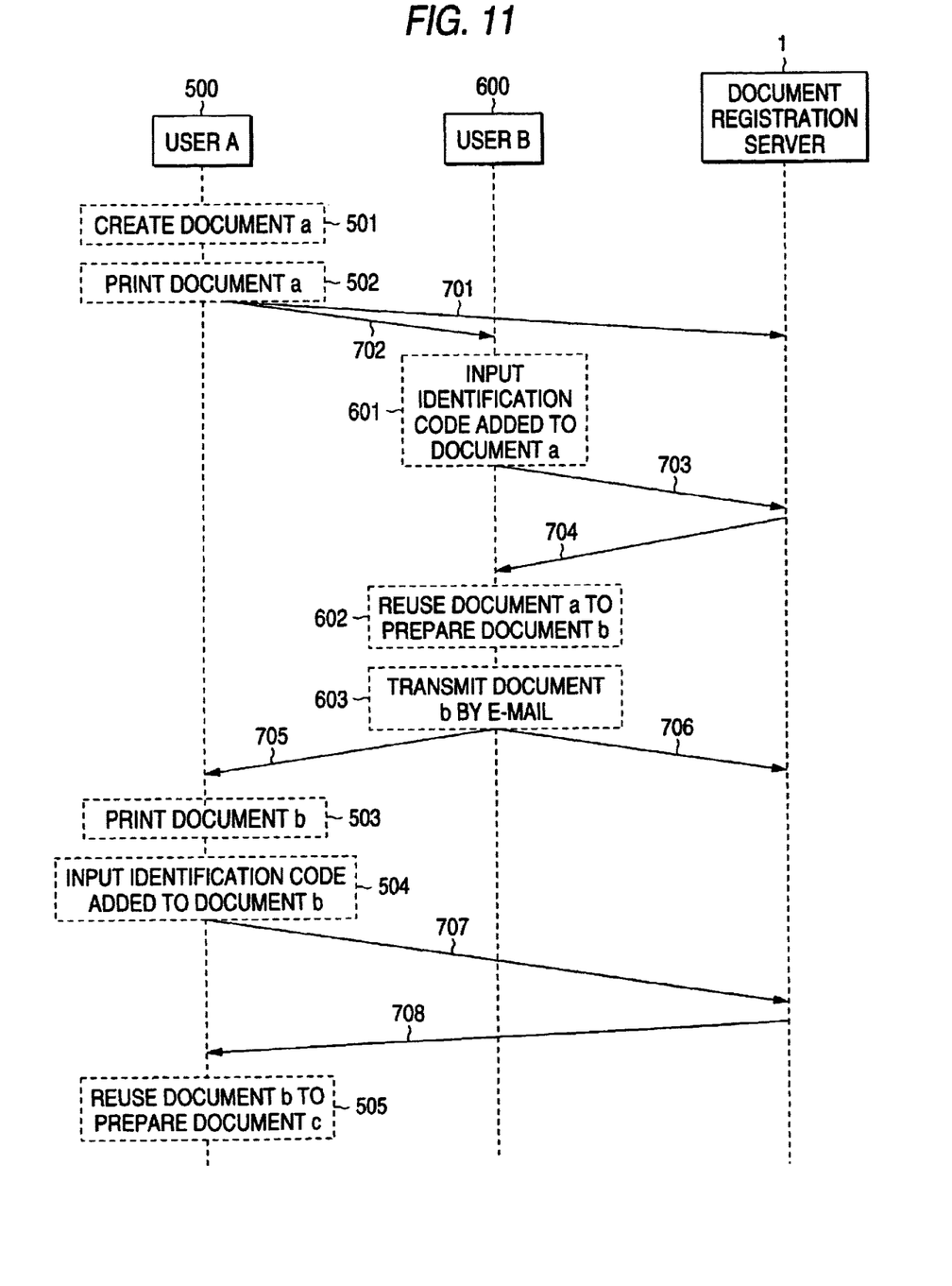
FIG. 11 is a chart to show an example of a flow in which two users register and reuse a document.

FIG. 11 is a chart to show an example of a flow in which two users register and reuse a document. Each step represented by a dashed line denotes a paper-printed document.

When user A 500 creates document a at step 501 and prints it at step 502, the document a is registered in the document registration server 1 at the same time at step 701.

When the user A 500 distributes the printed document a to user B 600 at step 702 and the user B 600 obtaining the document a edits it to prepare a new document, the user B 600 inputs the identification code such as bar code added to the document a as an image at step 601.

When the user B 600 inputs the identification code as an image, the identification code and information required for requesting the document are transmitted to the document registration server 1 at step 703 and the document registration server 1 then returns the document a to the user B 600 at step 704.

Next, when the user B 600 edits (reuses) the document a to prepare a document b at step 602 and transmits the document b to the user A 500 at step 705, the document b is registered in the document registration server 1 at the same time at step 706.

The user A 500 prints and retains the document b sent from the user B 600 at step 503 and if the user A 500 wants to again obtain the document b, the user A 500 inputs the identification code such as bar code added to the document b as an image at step 504.

When the user A 500 inputs the identification code as an image, the identification code and information required for requesting the document are transmitted to the document registration server 1 at step 707 and the document registration server 1 then returns the document b to the user A 500 at step 708.

The user A 500 edits the returned document b to prepare a document c at step 505 and distributes and retains the document c.

One document is thus used by a number of users, whereby it can be used efficiently and effectively.

The document use flow shown in FIG. 11 is an example and the number of users and the document use method are not limited to the example.

As has been described heretofore, according to the present invention, when the user prints a document, or transmits or receives a document by E-mail, or executes image input, identification code is automatically added to the document and is registered in the document registration server and the identification code added to a document printed on paper can be input through the image scanner for obtaining the desired document. Thus, when a document is registered or retrieved, since it is not necessary to select a document registration server or enter a keyword, the registration and retrieval of the document can be facilitated.

Therefore, a document can be reused easily, a created document can be used effectively, and trouble for creating a new document can be saved, so that a document can also be created, distributed, and reused efficiently among the users.

What is claimed is:

1. An electronic document filing method comprising the steps of:

adding an identification code to an electronic document, wherein the identification code is based on an identification code generation time, a document name, a creator name, and a network address of the computer on which the electronic document was generated and further wherein said document name comprises a file name associated with a software application;

registering the electronic document to which the identification code is added in a document server connected through a network;

storing the document in the document server in a location based on the identification code of the document;

printing the registered electronic document and the identification code on the same paper face;

reading the printed identification code; and retrieving and obtaining the electronic documented based on the read identification code.

2. The electronic document filing method as set forth in claim 1, wherein the electronic document is registered automatically at the same time as one of in the case of the electronic document is printed, the electronic document is transmitted to another user, the electronic document is received from another printer, and the electronic document is input through an image.

3. The electronic document filing method as set forth in claim 1, wherein the identification code is printed on an arbitrary layout at an arbitrary position on the paper face.

4. The electronic document filing method as set forth in claim 3, wherein the identification code is printed on the paper face as bar code.

5. The electronic document filing method as set forth in claim 3, wherein after a printing area of the electronic document is set, the identification code is printed where except on the printing area of the electronic document at the time of printing.

6. The electronic document filing method as set forth in claim 1, wherein the document server extracts the name of the document from the identification code of the document and stores the document in a subdirectory based, at least in part, on the name of the document.

7. An electronic document filing system comprising:

identification code addition means for adding identification code proper to the electronic document thereto, wherein the identification code is based on an identification code generation time, a document name, a creator name, and a network address of the computer on which the electronic document was generated and further wherein said document name comprises a file name associated with a software application;

a document server for registering the electronic document to which the identification code is added to the document server and for storing the document in a location based, at least in part, on the identification code;

print means for printing the registered electronic document and the identification code on the same paper face;

identification code read means for the identification code on the paper face;

identification code interpretation means for interpreting the identification code read by the identification code read means; and identification code transfer means for transferring the identification code interpreted by the identification means to the document server.

8. The electronic document filing system as set forth in claim 7, wherein the electronic document is registered automatically at the same time as one of in the case of the electronic document is printed, the electronic document is transmitted to another user, the electronic document is received from another printer, and the electronic document is input through an image reader.

9. The electronic document filing system as set forth in claim 7, wherein the identification code addition means includes an identification code generating section generating the identification code, a print data generating section converting the electronic document into an print image data, and a data combining section combining the identification code with the print image data.

10. The electronic document filing system as set forth in claim 9, wherein the print means prints the identification code on an arbitrary layout at an arbitrary position on the paper face.

11. The electronic document filing system as set forth in claim 10, wherein after a printing area of the electronic document is set as the print image data in the print data generating section, the data combining section combines the identification code generated from the identification code generating section with the print image data so that the identification code may be printed where except on the printing area of the electronic document.

12. The electronic document filing system as set forth in claim 9, wherein the identification code is printed on the paper face as bar code.

13. The electronic document filing system of claim 7, wherein the document server extracts the name of the document from the identification code of the document and stores the document in a subdirectory based, at least in part, on the name of the document.

* * * * *

UNITED STATES PATENT AND TRADEMARK OFFICE
CERTIFICATE OF CORRECTION

PATENT NO. : 6,631,495 B2
DATED : October 7 2003
INVENTOR(S) : Yasuo Kato et al.

Page 1 of 1

It is certified that error appears in the above-identified patent and that said Letters Patent is hereby corrected as shown below:

<u>Column 12,</u>
Line 31, "as one in the case" should read -- as one in the case in which --.
Line 41, "an print" should read -- a print --.
Line 54, "printed where except" should read -- printed anywhere except --.

Signed and Sealed this

Sixth Day of April, 2004

JON W. DUDAS
*Acting Director of the United States Patent and Trademark Office*